United States Patent [19]

Sigg

[11] Patent Number: 4,887,489
[45] Date of Patent: Dec. 19, 1989

[54] BOWL-MILL GEARING

[75] Inventor: Hans Sigg, Mutschellen, Switzerland

[73] Assignee: MAAG Gear-Wheel & Machine, Co. Ltd., Zurich, Switzerland

[21] Appl. No.: 138,146

[22] Filed: Dec. 28, 1987

[30] Foreign Application Priority Data

Apr. 9, 1987 [CH] Switzerland .................. 1371/87

[51] Int. Cl.$^4$ .............................................. F16H 1/28
[52] U.S. Cl. ...................................... 74/801; 74/413; 74/421 A
[58] Field of Search ..................... 64/413, 414, 421 R, 64/421 A, 801

[56] References Cited

U.S. PATENT DOCUMENTS

| 2,714,824 | 8/1955 | Schmitter | 74/421 A |
| 2,813,432 | 11/1957 | Hoskins | 74/421 R |
| 4,471,671 | 9/1984 | Sigg | 74/801 |
| 4,593,575 | 6/1986 | Reid | 74/421 A |
| 4,736,829 | 4/1988 | Noel | 74/414 X |

FOREIGN PATENT DOCUMENTS

| 1258041 | 1/1968 | Fed. Rep. of Germany | 74/413 |
| 3145655 | 7/1983 | Fed. Rep. of Germany | . |
| 3240222 | 4/1986 | Fed. Rep. of Germany | . |
| 0113367 | 6/1984 | Japan | 74/421 R |
| 19298 | of 1895 | United Kingdom | 74/421 R |

OTHER PUBLICATIONS

Dudley, D. W., "Gear Design Trends", in *Handbook of Practical Gear Design* (New York, McGraw-Hill, 1984), pp. 1.24-1.25.

Lynwander, P., "Types of Gear Drives: Arrangements, Tooth Forms", in *Gear Drive Systems* (New York, Marce Dekker, 1983), pp. 1-11.

*Primary Examiner*—Dwight G. Diehl
*Attorney, Agent, or Firm*—Bachman & LaPointe

[57] ABSTRACT

A bowl-mill gearing (14) which consists of an epicyclic gear (14b) and an intermediate gear (14a) composed of spur wheels (18, 20, 22, 24) with parallel axes. The driving shaft (26) of the intermediate gear (14a) is disposed parallel to the driven shaft (52) and with spacing from the mill axis (42). The driven wheel (24) of the intermediate gear (14a) means with a small intermediate wheel (22) which is mounted for rotation outside the annular gear case (20) of the bowl-mill gearing (14) and is disposed so that it projects through a cut-out (80) in the gear case (30) into the interior of the gear case. The dimensions of the intermediate wheel (22) and of the driven wheel (24) are selected so that the wall (34) of the annular gear case only has to be provided with a cut-out (80) which is less than an eighth of the circumference of the gear case as a result of which there is negligible weakening of the gear case. The bow-mill gearing combines all the advantages of epicyclic and parallel-shaft gears while eliminating a bevel gear as an intermediate gear.

6 Claims, 2 Drawing Sheets

BOWL-MILL GEARING

BACKGROUND OF THE INVENTION

The invention relates to bowl-mill gearing having an annular gear case, a receiving plate, which can be driven about a vertical mill axis, for a grinding bowl, a thrust bearing to support the receiving plate on the gear case, an epicyclic gear through which the receiving plate can be driven, and an intermediate gear with a driving shaft and a driven shaft which is arranged coaxially with the receiving plate and is coupled to the sun wheel of the epicyclic gear and which carries the driven wheel of the intermediate gear.

Bowl-mill gearing of this type which is known from DE-PS 31 45 655 goes back to the year 1981. Before the introduction of such bowl-mill gearing with a built-in epicyclic gear, the most widespread type of construction for gearing for the drive of bowl mill crushers was a two-stage parallel-shaft gear with an intermediate gear in the form of a bevel gear. The bevel gear renders possible the use of a driving motor installed at ground level with a horizontal shaft. The vertical driven shaft of the parallel-shaft gear drives the receiving plate with the grinding bowl mounted thereon. The receiving plate transmits the very great axial grinding forces to a pressure plate through pivoted pads of a thrust bearing. The pressure plate, which is secured at the top to the gear case, likewise of annular construction at least below the receiving plate, then transmits the axial grinding forces through the gear case to the bed plate of the bowl mill crusher. Because of the gear wheels of the two gear stages of the parallel-shaft gear, its gear case has to be cut open laterally at least over about a fifth of its circumference. Because of the cut-away gear case, the large axial forces which act on the receiving plate cannot be distributed symmetrically and drawn off into the bed plate. In order that a more or less satisfactory distribution of load over the pivoted pads of the thrust bearing may nevertheless be achieved, the pressure plate of the gear case must be made very stiff and very heavy.

In the bowl-mill gearing of the type mentioned at the beginning, which is known from said DE-PS 31 45 655, the problem of the uniform transmission of the axial load is ideally solved by means of the epicyclic gear since the axial forces are transmitted to the bed plate through the completely symmetrical, annular gear case. But this known bowl mill gearing also comprises a bevel gear as an intermediate gear in order that a driving motor disposed at ground level with a horizontal shaft may be able to be used. The bevel gear is an angular gear, the driving shaft of which likewise requires a cut-out in the annular case but this is very small in comparison with the cut-out necessary with the known parallel-shaft gear and only weakens the wall of the gear case to a negligible extent. The loading capacity of bevel gears is limited, however, for which reason an effort is made to avoid these.

DE-PS 32 40 222 shows such a possibility of avoidance in the form of a bowl mill crusher which likewise comprises an epicyclic gear but in which the external wheel of the epicyclic gear is not supported on an annular gear case which rests on the bed plate but is suspended, via an annular flange projecting outwards, on a frame resting on the bed. This construction of the bowl mill crusher renders possible the use of a driving motor with a vertical shaft, which motor is disposed below the epicyclic gear coaxially with this and may be provided with its own reduction gear mounted directly on it. As a result, a bevel gear and a cut-open case with the associated disadvantages are admittedly eliminated but at the expense of the arrangement of the whole bowl mill crusher at ground level since a basement is necessary for the driving motor. Such a basement is not possible in all cases, requires a special construction of the bowl mill crusher and so involves additional costs.

It is the object of the invention to eliminate a bevel gear as an intermediate gear in bowl-mill gearing of the type mentioned at the beginning without it being necessary to provide a basement below the bowl mill gearing for the driving motor and without the transmission of axial load being appreciably impaired.

BRIEF SUMMARY OF THE INVENTION

According to the invention, this problem is solved in the bowl-mill gearing of the type mentioned at the beginning in that the driving shaft is disposed parallel to the driven shaft and outside the annular gear case, the intermediate gear consists of spur wheels with parallel axes, and one of the spur wheels is a small intermediate wheel which meshes with the driven wheel of the intermediate gear through a cut-out in the annular gear case.

The bowl-mill gearing according to the invention retains all the advantages offered by the epicyclic gear, namely the symmetrical transmission of the axial load to the bed and the branching of the load in the heavy gear stage (three strands), but without having the disadvantages associated with a bevel intermediate gear since the intermediate gear consists only of spur wheels with parallel axes, of which one small intermediate wheel meshes with the driven wheel of the intermediate gear through a small cut-out in the annular gear case. The cut-out in the annular gear case is so small that the weakening of the annular gear case is negligible. Thus the intermediate gear composed of spur wheels with parallel axes has all the advantages offered by a parallel-shaft gear, namely the absence of limitation in the loading capacity but without an appreciable weakening of the annular gear case having to be accepted into the bargain.

The invention also includes additional advantageous embodiments.

In one embodiment of the invention, the driven wheel of the intermediate gear projects with its circumference into the immediate vicinity of the inside of the annular gear case so that the intermediate wheel of the intermediate gear only has to extend into the interior of the annular gear case over a short distance (corresponding to about the height of the teeth of the driven wheel). The size of the cut-out is correspondingly small. The dimensions of the driven wheel and of the intermediate wheel meshing with it are preferably selected in such a manner that the wall of the annular gear case has to be cut away over a length of less than one eighth of the circumference of the gear case.

In another embodiment of the invention, in which the intermediate gear case is flange-mounted laterally on the annular gear case, already existing bowl-mill gearing, for example of the type known from DE-PS 31 45 655, can be retrofitted, in a simple manner, with a parallel-shaft intermediate gear in order to eliminate the restrictions associated with the use of a bevel gear as an intermediate gear and to retain the advantage of the arrangement at ground level. It is true that a driving motor with a vertical shaft is necessary but this must be regarded as equally advantageous as a motor with a horizontal shaft.

In another embodiment of the invention, the intermediate gear occupies particularly little space in the horizontal and vertical directions.

BRIEF DESCRIPTION OF THE DRAWINGS

One example of embodiment of the invention is described in more detail below with reference to the drawings.

DETAILED DESCRIPTION OF THE INVENTION

Figure 1:
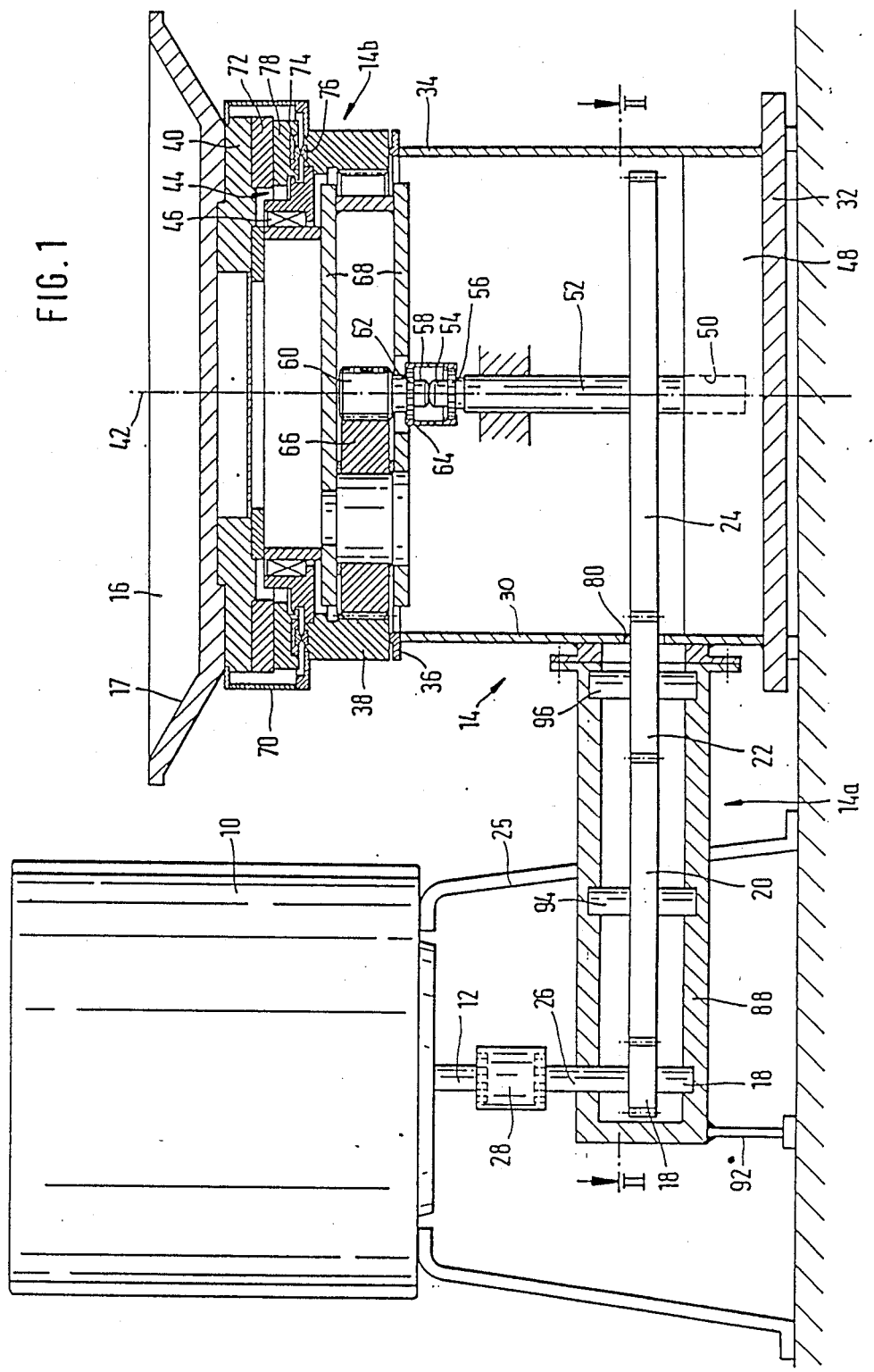
FIG. 1 shows, partially in side view and partially in longitudinal section, a bowl mill crusher with the bowl-mill gearing according to the invention
Figure 2:
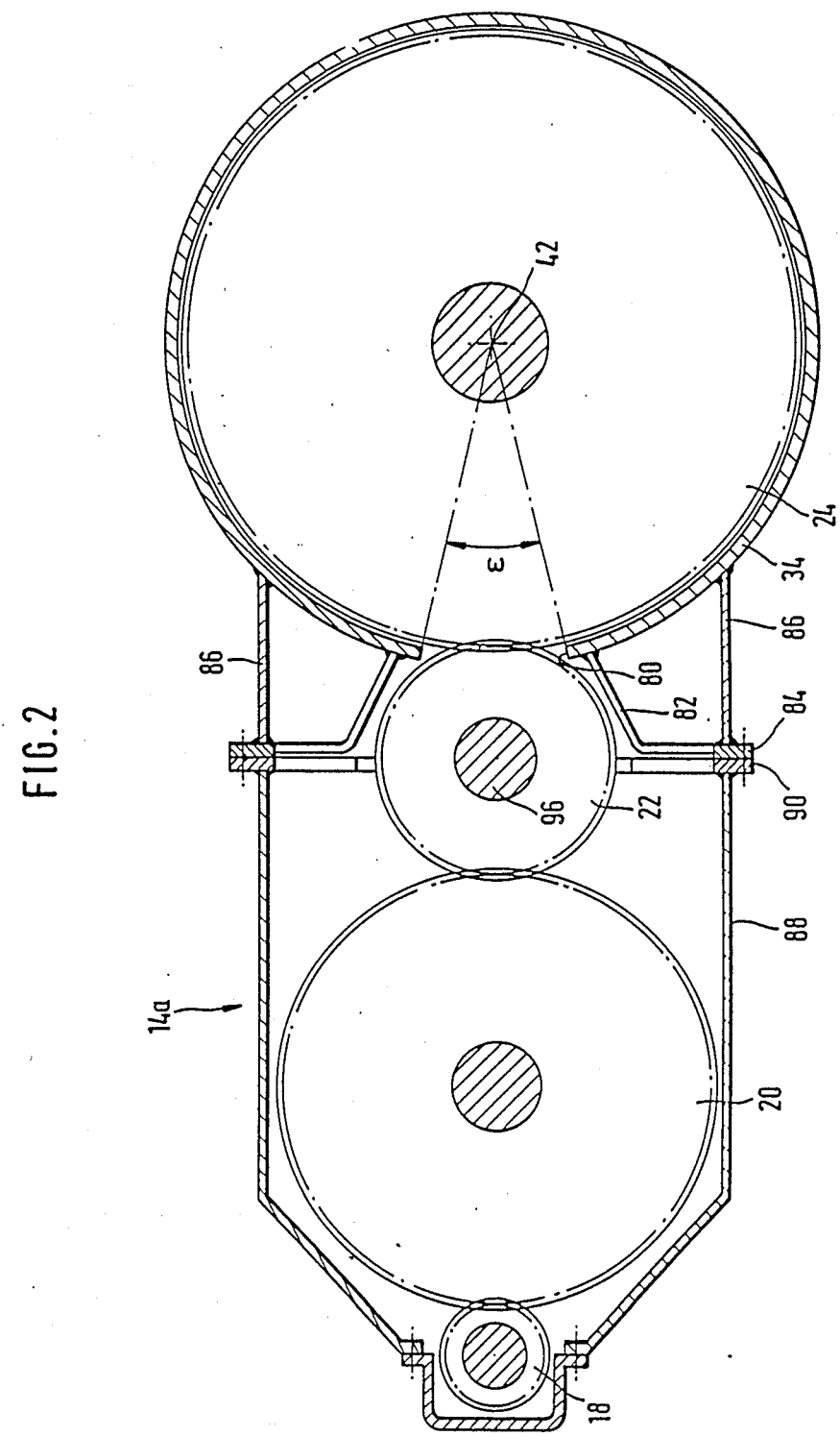
FIG. 2 shows a cross-section on the line II—II in FIG. 1.

The form of embodiment of a bowl mill crusher illustrated in FIGS. 1 and 2 consists of a driving motor 10 with a shaft 12 disposed vertically and of bowl-mill gearing 14 for the drive of a grinding bowl 16. The bowl-mill gearing 14 comprises an intermediate gear 14a which consists of spur wheels 18, 20, 22, 24 with parallel axes and an epicyclic gear 14b. The driving motor 10 is a multipolar electric motor which may be provided with its own reduction gear (not illustrated) mounted directly on it. The driving motor 10 is mounted on a platform 25 above the intermediate gear 14a so that it can easily be coupled to its driving shaft 26 by means of a coupling 28.

According to the illustration in FIG. 1, the bowl-mill gearing 14 comprises an annular gear case 30 with a bed plate 32 and a cylindrical case wall 34. The cylindrical case wall 34 ends in a flange 36 at the top. The epicyclic gear 14b has an external wheel 38 rests on the flange 36 and is bolted to the flange. Thus the external wheel 38 extends the annular gear case upwards as illustrated. A receiving plate 40 is mounted on the external wheel 38 for rotation about a vertical mill axis or axis of rotation 42, by means of a thrust bearing 44 and a radial bearing 46. The receiving plate 40 serves to receive and centre the grinding bowl 16 which comprises, at its upper side, an annular track 17 for grinding rollers not illustrated. One of the spur wheels of the intermediate gear 14a, namely its driven wheel 24, is disposed in the annular gear case 30. A base 48 contains a bearing 50 in which a driven shaft 52 of the intermediate gear is mounted and supported at the bottom, to which shaft the driven wheel 24 is secured. The upper end of the driven shaft 52 is constructed in the form of a crowned vertical journal 54 and of coupling teeth 56. A vertical journal 58 is plane at its lower end and is supported on the crowned vertical journal 54. With its upper end, the vertical journal 58 is formed on a sun wheel 60 disposed in the axis of rotation 42. Between the sun wheel 60 and the plane lower end, the vertical journal 58 is provided with coupling teeth 62. The coupling teeth 56 and 62 are connected by an internally toothed coupling sleeve 64.

The sun wheel 60 meshes with three planet wheels 66 which are rotatably attached to a satellite carrier 68.

The planet wheels 66, only one of which is visible in FIG. 1, mesh with the internally toothed, annular external wheel 38. Secured to the external wheel 38, at the top, is an upper case portion 70 which is in close contact with the receiving plate 40 at its upper end. The thrust bearing 44 consists of an upper bearing ring 72 which is secured to the receiving plate 40, and of an upper thrust ring 74 which rests for tilting on a lower thrust ring 76 and is embedded in a lower bearing ring 78 on which the upper bearing ring 72 rests for sliding. The bearing rings are divided, as usual, into a plurality of bearing-ring pads.

Thus the external wheel 38 serves not only to transmit the driving power to the receiving plate 40 but also takes up the axial loading of the receiving plate 40 through the thrust bearing 44 and introduces it into the annular gear case 30 which transmits it to the bed plate 32.

The case wall 34 is provided with a cut-out 80 round which a flange member 82 is welded on which carries a flange 84 and is additionally supported by reinforcing members 86 which are welded to the flange 84 and the case wall 34. The external diameter of the driven wheel 24 of the intermediate gear 14a is only somewhat smaller than the internal diameter of the annular gear case 30, that is to say the driven wheel reaches with its circumference almost as far as the inside of the case wall 34.

The intermediate gear 14a, which consists of the spur wheels 18, 20, 22, 24 with parallel axes, comprises a case 88 which is provided on the one side with a flange 90 which is bolted to the flange 84 (FIG. 2) and which is supported on the other side on the bed as represented symbolically by a column 92 in FIG. 1. The shaft 26, which carries the driving wheel 18, is mounted for rotation in the housing 88 and is coupled at the upper end, by the coupling 28, to the shaft 12 of the driving motor 10. The spur wheel 20 of the intermediate gear 14a is a large intermediate wheel which is secured to a shaft 94 mounted for rotation in the housing 88 and which meshes with the driving wheel 18. The spur wheel 22 of the intermediate gear 14a is a small intermediate wheel which is secured to a shaft 96 and meshes with the large intermediate wheel 20. The shaft 96 is mounted for rotation in the housing 88, in the plane of mutual contact between the flanges 84 and 90. The small intermediate wheel 22 projects through the cut-out 80 into the interior of the annular gear case 30 and there meshes with the driven wheel 24 of the intermediate gear which is mounted for rotation in the annular gear case as described above. The other three spur wheels 18, 20, 22 of the intermediate gear 14a are disposed in the case 88 of the intermediate gear as described. The driving shaft 26 of the intermediate gear 14a is disposed parallel to the driven shaft 52 of the intermediate gear as illustrated. It can easily be seen from FIG. 1 that all the spur wheels 18, 20, 22, 24 of the intermediate gear 14a are disposed in a common horizontal plane.

As a result of the fact that the driven wheel 24 reaches, with its circumference, to immediately in front of the inside of the case wall 34 and as a result of the selection of the dimensions of the intermediate wheel 22 and of the driven wheel 24, the case wall 34 of the annular gear case 30 only has to be cut open over less than an eighth of its circumference. In the example of embodiment illustrated, the driving wheel 18 has a diameter of 374 mm, the large intermediate wheel 20 a diameter of 1938 mm, the small intemediate wheel 22 a diameter of 1000 mm and the driven wheel 24 a diameter of 2750 mm. The teeth in the whole bowl mill gearing 14 are selected so that, with a speed of rotation of the shaft 12 of the driving motor 10 of 1495 r.p.m., a speed of rotation of the grinding bowl 16 of 5 r.p.m. results. The spacing between the centre axis of the shaft 12 and the driving shaft 26 of the driving motor 10 on the one hand and the mill axis 42 on the other hand is 4500 mm in the said example. The size of the cut-out 80, represented by an angle $\epsilon$, is less than 360°/8 in this case, that is to say less than 45°.

What is claimed is:

1. A bowl-mill gearing comprising:
   (a) an annular gear case having an internal diameter $D_1$ and a cut out portion;
   (b) a receiving plate, which can be driven about a vertical mill axis, for a grinding bowl;
   (c) a thrust bearing to support the receiving plate on the annular gear case;
   (d) an epicyclic gear through which the receiving plate can be driven; and
   (e) intermediate gear for driving the epicyclic gear, said intermediate gear comprising a plurality of spur wheels having parallel axes, a driving shaft having an axis parallel to the axes of the spur wheels and a driven shaft having an axis parallel to the axes of the spur wheels and the axis of the drive shaft, said driven shaft being arranged within the annular gear case coaxial with the receiving plate and coupled to a sun gear of the epicyclic gear wherein the driven shaft carries one of the spur wheels as a driven wheel of the intermediate gear whereby another of the spur wheels having a diameter $D_2$ penetrates the cut-out portion of the annular gear case and meshes with the driven wheel for driving same, the driven wheel having an external diameter $D_3$ substantially equal to but less than the internal diameter $D_1$ of the annular gear case and greater than diameter $D_2$ and proximate to the cut-out portion thereby minimizing the size of the cut-out portion of the annular gear case penetrated by said another spur wheel so as to prevent weakening of the annular gear due to large axial forces acting on the receiving plate.

2. Bowl-mill gearing according to claim 1, characterised in that the external diameter of the driven wheel (24) of the intermediate gear (14a) is smaller than the internal diameter of the annular gear case (30).

3. Bowl-mill gearing according to claim 1, characterised in that the intermediate gear (14a) comprises a case (88) which is flange-mounted laterally on the annular gear case (30) and in which the spur wheels (18, 20, 22) of the intermediate gear (14a) are disposed with the exception of the driven wheel (24).

4. Bowl-mill gearing according to claim 1 characterised in that one of the spur wheels is a large intermediate wheel (20) which meshes on the one hand with the small intermediate wheel (22) and on the other hand with the driving wheel (18) of the intermediate gear (14a).

5. Bowl-mill gearing according to claim 1, characterised in that all the spur wheels (18, 20, 22, 24) of the intermediate gear (14a) are disposed in one plane.

6. Bowl-mill gearing according to claim 1, characterised in that the size of the cut-out (80) has an arc angle $\epsilon < 360°/8$.

* * * * *